United States Patent
Das

(10) Patent No.: US 11,502,817 B2
(45) Date of Patent: Nov. 15, 2022

(54) ENHANCED DATA SECURITY SYSTEM AND METHOD THEREOF

(71) Applicant: Wipro Limited, Bangalore (IN)

(72) Inventor: Rishav Das, Howrah (IN)

(73) Assignee: Wipro Limited, Bangalore (IN)

( * ) Notice: Subject to any disclaimer, the term of this patent is extended or adjusted under 35 U.S.C. 154(b) by 321 days.

(21) Appl. No.: 16/830,307

(22) Filed: Mar. 26, 2020

(65) Prior Publication Data

US 2021/0250162 A1 Aug. 12, 2021

(30) Foreign Application Priority Data

Feb. 12, 2020 (IN) .............................. 202041006118

(51) Int. Cl.
| | | |
|---|---|---|
| *H04L 9/00* | (2022.01) | |
| *H04L 9/06* | (2006.01) | |
| *H04L 67/1087* | (2022.01) | |
| *G06N 20/00* | (2019.01) | |
| *H04L 67/306* | (2022.01) | |
| *H04L 9/08* | (2006.01) | |

(Continued)

(52) U.S. Cl.
CPC .............. *H04L 9/002* (2013.01); *G06N 3/04* (2013.01); *G06N 3/08* (2013.01); *H04L 9/008* (2013.01); *H04L 9/0618* (2013.01); *H04L 67/1093* (2013.01)

(58) Field of Classification Search
CPC ....... H04L 9/002; H04L 9/008; H04L 9/0618; H04L 9/0631; H04L 9/0894; H04L 67/1093; H04L 67/306; G06N 3/04; G06N 3/08; G06N 5/04; G06N 20/00
See application file for complete search history.

(56) References Cited

U.S. PATENT DOCUMENTS

| | | | |
|---|---|---|---|
| 6,658,164 B1 | 12/2003 | Irving et al. | |
| 2013/0133053 A1* | 5/2013 | Akunuru ................. | G06F 21/36 726/7 |

(Continued)

FOREIGN PATENT DOCUMENTS

| | | |
|---|---|---|
| CN | 106656463 A | 5/2017 |
| CN | 105897396 B | 12/2018 |

OTHER PUBLICATIONS

Beyond Credential Stuffing: Password Similarity Models using Neural Network, Tal et al., Published 2019 (Year: 2019).*

*Primary Examiner* — Vu V Tran
(74) *Attorney, Agent, or Firm* — Finnegan, Henderson, Farabow, Garrett & Dunner, LLP

(57) ABSTRACT

The disclosure relates to an enhanced data security system and method thereof. In some embodiments, the method includes receiving the transactional credential dataset from a user application. The transactional credential dataset is provided by a user to the user application. The method further includes storing the transactional credential dataset in nodes of a graphical embedding storage model. The nodes further store historical credential datasets of the user. Further, the method includes determining a correlation among the historical credential datasets using an artificial neural network (ANN) model and detecting a pattern of the transactional credential dataset based on the correlation. The ANN model is trained based on credential datasets provided by users stored in the nodes of the graphical embedding storage model.

18 Claims, 4 Drawing Sheets

(51) Int. Cl.
    *G06N 5/04*     (2006.01)
    *G06N 3/04*     (2006.01)
    *G06N 3/08*     (2006.01)

(56) References Cited

U.S. PATENT DOCUMENTS

| | | | |
|---|---|---|---|
| 2017/0163625 A1* | 6/2017 | Brown | G06F 21/32 |
| 2018/0124033 A1* | 5/2018 | Greenspan | G06F 21/31 |
| 2018/0332023 A1* | 11/2018 | Chari | H04L 63/20 |
| 2019/0073457 A1* | 3/2019 | Jiang | G06F 3/0412 |
| 2020/0296081 A1* | 9/2020 | Ben David | H04L 9/3226 |
| 2020/0380114 A1* | 12/2020 | Kursun | H04L 63/0838 |

* cited by examiner

ENHANCED DATA SECURITY SYSTEM AND METHOD THEREOF

TECHNICAL FIELD

The present invention relates to data security. In particular, the present invention relates to a method and system for enhancing data security using artificial neural network (ANN) model.

BACKGROUND

Now-a-days, cryptographic key generation systems are available for securing credential information/data (for e.g. password). In general, when a cryptographic key generation system is fed with the credential information/data, the cryptographic key generation system encrypts the credential information/data for security purpose. Moreover, an encrypted credential information/data also termed as a cipher text that may be obtained by employing Rivest-Shamir-Adleman (RSA) algorithm or other applications. The encryption of the credential information/data may keep the hackers away. In other words, it becomes difficult for any hacker or unauthorized person to access the encrypted credential information/data easily. The cryptographic key generation systems may include one or more rule-based algorithms that may be based on some predetermined mathematical rules. By the implementation of the rule-based algorithms some mimic values are generated in real time by performing a coding.

Typically, the cryptographic key generation system generates a specific random output. However, it's easy to access a password by the hackers, in case a same format or pattern associated with the password is provided as credential information/data every time. Therefore, even with the encrypted information/data the hackers are capable to access the password pattern, because the password is associated with a common pattern all the time. Additionally, the cryptographic key generation systems get affected by some ransomware or any other malicious and unwanted software problems, resulting in a variety of undesirable results depending on the type of malware. Moreover, in available cryptographic key generation systems, cipher text generation process includes the execution of rule-based algorithms that further involves random numbers and it's somewhat easy to know the algorithm behavior for extracting the pattern of a specific password for the unauthorized person.

There are various cryptographic key generation systems and methods available for providing security to the credential information/data. However, they don't describe any method related to detection of the pattern associated with the credential information/data to be stored. One of the available methods, lacks in recognizing hidden patterns which may be subjected to violation and further change the pattern in order to remove any cyclic patterns from the credential information/data provided by the user. The available methods are unable to determine the pattern automatically and change the pattern such that the methods may be configured to take the password age. Conventionally, the existing methods lack in resolving the problem of pattern elimination from the secured password. Also, the conventional systems and methods are not able to perform both encoding and prediction of the pattern associated with the credential information/data.

SUMMARY

In one embodiment, a method of detecting a pattern in transactional credential dataset is disclosed. In one example, the method may include receiving the transactional credential dataset from a user application. It should be noted that the transactional credential dataset may be provided by the user to a user application. The method may further include storing the transactional credential dataset in one of a plurality of nodes of a graphical embedding storage model. It should be noted that the one of the plurality of nodes may further store historical credential datasets of the user. Further, the method may include determining a correlation among the historical credential datasets using an artificial neural network (ANN) model and detecting a pattern of the transactional credential dataset based on the correlation. It should be noted that the ANN model may be trained based on credential datasets from a plurality of users stored in the plurality of nodes of the graphical embedding storage model.

In another embodiment, a system for detecting a pattern in transactional credential dataset is disclosed. In one example, the system may include a processor and a memory communicatively coupled to the processor, the memory may store processor-executable instructions, which, on execution, may causes the processor to receive the transactional credential dataset from a user application. It should be noted that the transactional credential dataset may be provided by a user to the user application. The processor-executable instructions, on execution, may further cause the processor to store the transactional credential dataset in one of a plurality of nodes of a graphical embedding storage model, it should be noted that the one of the plurality of nodes further stores historical credential datasets of the user. The processor-executable instructions may further cause the processor to determine a correlation among the historical credential datasets using an artificial neural network (ANN) model, it should be noted that the ANN model may be trained based on credential datasets from a plurality of users stored in the plurality of nodes of the graphical embedding storage model. The processor-executable instructions may further cause the processor to detect a pattern of the transactional credential dataset based on the correlation.

In yet another embodiment, a non-transitory computer-readable medium storing computer-executable instruction for detecting a pattern in transactional credential dataset is disclosed. In one example, the stored instructions, when executed by a processor, may cause the processor to perform operations including receiving the transactional credential dataset from a user application. It should be noted that the transactional credential dataset may be provided by the user to the user application. The operations may further include storing the transactional credential dataset in one of a plurality of nodes of a graphical embedding storage model. It should be noted that the one of the plurality of nodes further stores historical credential datasets of the user. The operations may further include determining a correlation among the historical credential datasets using an artificial neural network (ANN) model. It should be noted that the ANN model may be trained based on credential datasets from a plurality of users stored in the plurality of nodes of the graphical embedding storage model. The operations may further include detecting a pattern of the transactional credential dataset based on the correlation.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
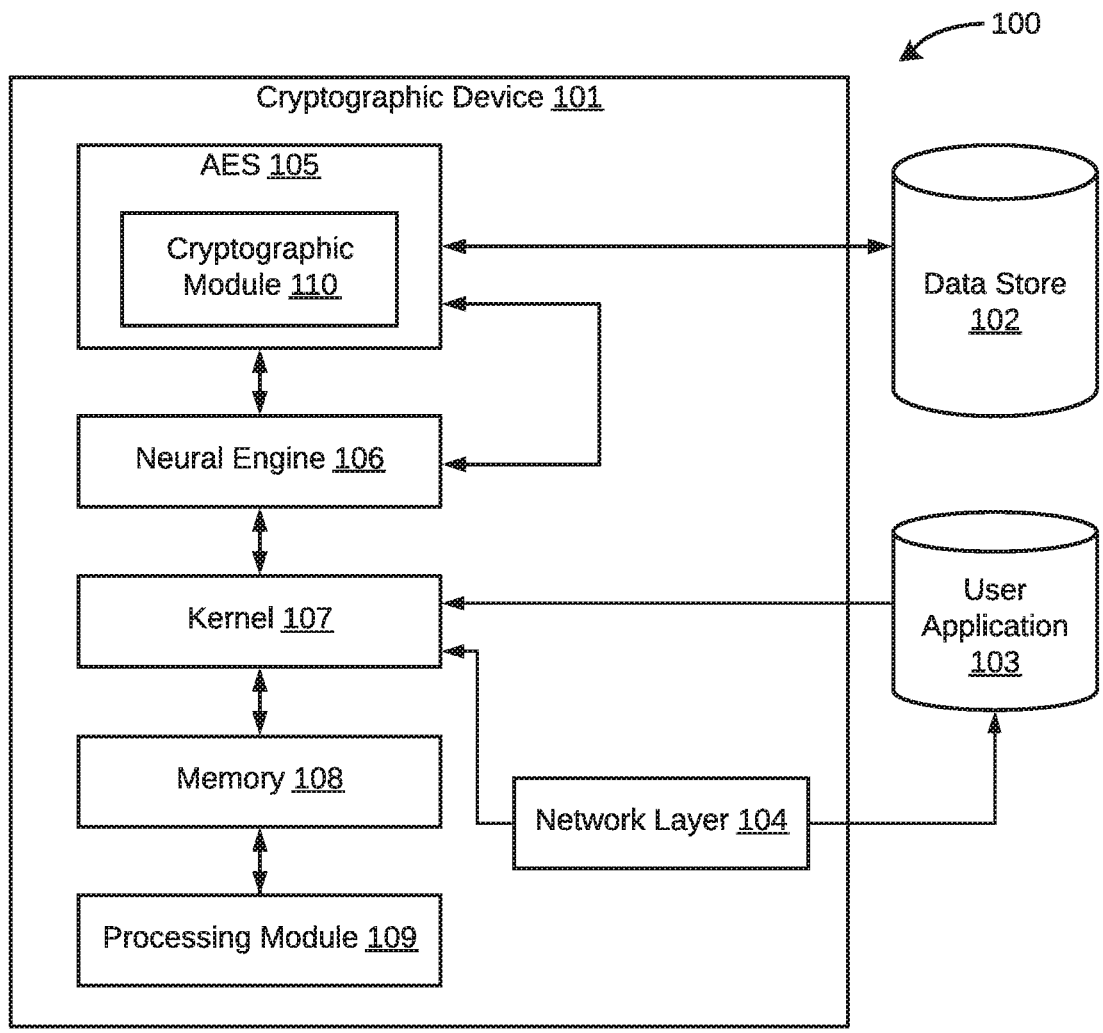
FIG. 1 is a block diagram of an exemplary system including cryptographic device configured to enhance data security, in accordance with some embodiments of the present disclosure.

Referring now to FIG. 1, an exemplary system 100 for providing enhanced data security is illustrated, in accordance with some embodiments of the present disclosure. The system 100 includes a cryptographic device 101, a data store 102, and a user application 103. The cryptographic device 101 may include a network layer 104, an advance encryption system (AES) 105, a neural engine 106, a kernel 107, a memory 108, and a processing module 109. The user application 103 may be provided within the system 100 to input the transactional credential dataset. A user enters the transactional credential dataset using the user application 103. The user application 103 may be directly coupled to the kernel 107 or via the network layer 104 depending upon requirement of the system 100. The user application 103 of the system 100 may vary depending on the user, i.e., which specific user application is used by the user for inputting the transactional credential dataset.

The cryptographic device 101 is the most important part of the system 100 that helps the user to secure the entered transactional credential dataset effectively from hackers. One of the main components of the cryptographic device 101, the kernel 107 that is communicatively interlinked to the neural engine 106, memory 108, and the user application 103. When the user application 103 dispatches the transactional credential dataset provided by the user, the cryptographic device 101 transfers the credential data to the kernel 107.

The kernel 107 is the core part of an operating system that interpret with the hardware to execute the process of data security. Here, the user application 103 may be considered as a part of hardware system. Herein, the selection of the kernel 107 does not depend on the type of user application 103 in any way. The kernel 107 may also participate with neural engine 106 during a process of training, predicting, error learning in the credential device 101. The memory 108 may be coupled to the kernel 107 and the processing module 109 inside the cryptographic device 101. The memory 108 may be provided between the kernel 107 and the processing module 109 for instant transaction of some input/output operations per second (IOPS) between the kernel 107 and the processing module 109. In other words, the memory 108 acts as a medium to run all these process by exchanging and storing instructions, variables and parameters. Herein, the memory 108 is a volatile memory 108 that may be subjected to frequent changes during a process of exchanging parameters and variables.

As will be described in greater detail below, the processing module 109 may be communicatively coupled to the memory 108. The processing module 109 further includes a processor and an operating system (not shown in FIG). Further, the processing module 109 performs the analyzation on the input received from the memory 108 and then accordingly processing may be executed. Further, these processes may be directed towards the kernel 107 by the memory 108. There is a possibility to modify the system 100 by connecting the processing module 109 directly to the user application 103. It should be noted, for a cloud-based application programming interface (API) as a service, the processing module 109 may be a cloud container or a docker. Therefore, the processing module 109 may be a part of any computing system varying from a mobile to a cloud computing system.

The neural engine 106 may be communicatively coupled between the kernel 107 and the AES 105. The neural engine 106 is the core component of the system 100 as it helps in enhancing data security effectively. The neural engine generates a plurality of patterns corresponding to the transactional credential dataset provided by the user to the kernel 107. There is a two-way communication between the neural engine 106 and kernel 107 as well as the AES 105. Initially, the neural engine 106 analyzes the incoming transactional credential dataset from the kernel 107 and then decides which part of the transactional credential dataset needs to be masked for the enhanced data security purpose. Based in the decision the neural network generates a plurality of patterns for the transactional credential dataset.

Moreover, the masking of the required part of the transactional credential dataset may enhance the security. The neural engine 106 correlates the patterns of historical transactional credential datasets and accordingly alters the pattern of the transactional credential dataset. Since, the neural engine 106 eliminates the linearity from the pattern determination calculations, the pattern associated with the transactional credential dataset becomes unpredictable. In other words, after masking it may be difficult for any unauthorized person to predict the pattern of the transactional credential dataset by performing any type of permutation combination methods. The detailed explanation and expended view of the neural engine 106 is provided in conjunction to FIG. 2.

The AES 105 may be interlinked between the neural engine 106 and the data store 102. The AES 105 processes the transactional credential dataset through an "ADDROUNDKEY", "SUBBYTE", "SHIFTROW", "MIXCOLUMN" methods respectively and then again through the "ADDROUNDKEY". After processing through all the above-mentioned methodologies, the AES 105 generates a specific cipher text for the transactional credential dataset. The process of converting the transactional credential dataset into cipher text may termed as encryption. Hence the AES 105 encrypts the transactional credential dataset into the cipher text. Further the AES 105 includes a cryptographic module 110 to make the system more robust. Now, the encrypted transactional credential dataset or the cipher text may be transferred to the data store 102.

With regards to the transactional credential dataset or the cipher text, the data store 102 receives the transactional credential dataset. The data store 102 may be a part of any external memory unit such as database, enterprise storage data bocks, and cloud data blocks and many other storages. In case of small-scale architectures, the data store 102 may be a local residing memory.

Figure 2:
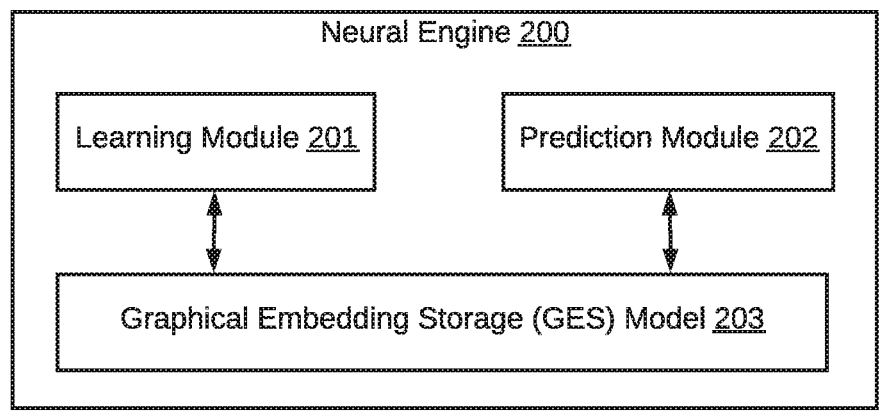
FIG. 2 is a block diagram of an exemplary neural engine present within the cryptographic device, in accordance with some embodiments of the present disclosure.

Referring now to FIG. 2, an exemplary neural engine 200 (analogous to the neural engine 106 present within the cryptographic device 101) is illustrated, in accordance with some embodiments of the present disclosure. The neural engine 200 may include a learning module 201, a prediction module 202, and a graphical embedding storage (GES) model 203. The GES model 203 may be communicatively coupled to both the learning module 201 as well as prediction module 202. There may be a two-way communication provided between the GES model 203 and the learning module 201, as well as GES model 203 and the prediction module 202. In other words, an information may be transmitted or received by the GES model 203 from the learning module 201 and prediction module 202. In a similar way, the learning module 201 and prediction module 202 are capable of receiving and sending the information to GES model 203. The GES model 203 is based on ANN model.

In the GES model 203 of the neural engine 200, at least one node assigned for each user and create a storage space for that user in the memory 108. The storage space may be utilized for storing the transactional credential datasets of corresponding user as well as any kind of secured transactional credential dataset in the memory 108. On the other hand, in the GES model 203, each node may be in communication with a set of peer nodes. Here, the peer nodes help in determining whether the transactional credential dataset associated with a specific node needs modification or not.

The learning module 201 learns the patterns of credential datasets as well as determines a cluster distance. Further, the learning module 201 fetches the patterns of historical credential datasets and then maps the relativity among all the patterns. The learning module 201 may assign each of the historical credential datasets into one of a set of clusters based on the relativity with respect to each of the remaining historical credential datasets. Further, the learning module 201 fetches a cipher text corresponding to each of the credential datasets and determines a set of word vectors based on the cipher text. With regards to the word vectors, all possible combinations of word vectors may be determined using the ANN model and all limits up to saturation may be considered. Moreover, the learning module 201 learns the patterns non-linearly and provides non-linear activations that makes the transactional credential dataset dynamic as well as robust. The credential datasets & weights of the neurons may be stored in an unstructured form in hidden layers, by the learning module 201 that may be further generated as checkpoints. It should be noted that every checkpoint is identical and has different way of training.

The prediction module 202, determines a cluster associated with the transactional credential dataset. Further, he prediction module 202 may predict the cipher representation for the transactional credential dataset based on the provided transactional credential dataset. The prediction module 202 predicts the cipher representation by selecting one of the combinations of word vectors. The checkpoint associated with the transactional credential dataset may be fetched by the prediction module 202 in order to predict the cipher representation for the transactional credential dataset based on the learning activation.

It should be noted that the cryptographic device 101 and the associated neural engine 200 may be implemented in programmable hardware devices such as programmable gate arrays, programmable array logic, programmable logic devices, or the like. Alternatively, the cryptographic device 101 and the associated neural engine 200 may be implemented in software for execution by various types of processors. An identified engine/module of executable code may, for instance, include one or more physical or logical blocks of computer instructions which may, for instance, be organized as an object, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for enhancing the data security of transactional credential dataset. For example, the exemplary system 100 and associated cryptographic device 101 may enhance the data security, by the process discussed herein. In particular, as will be appreciated by those of ordinary skill in the art, control logic and/or automated routines for performing the techniques and steps described herein may be implemented by the system 100 and the associated cryptographic device 101 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
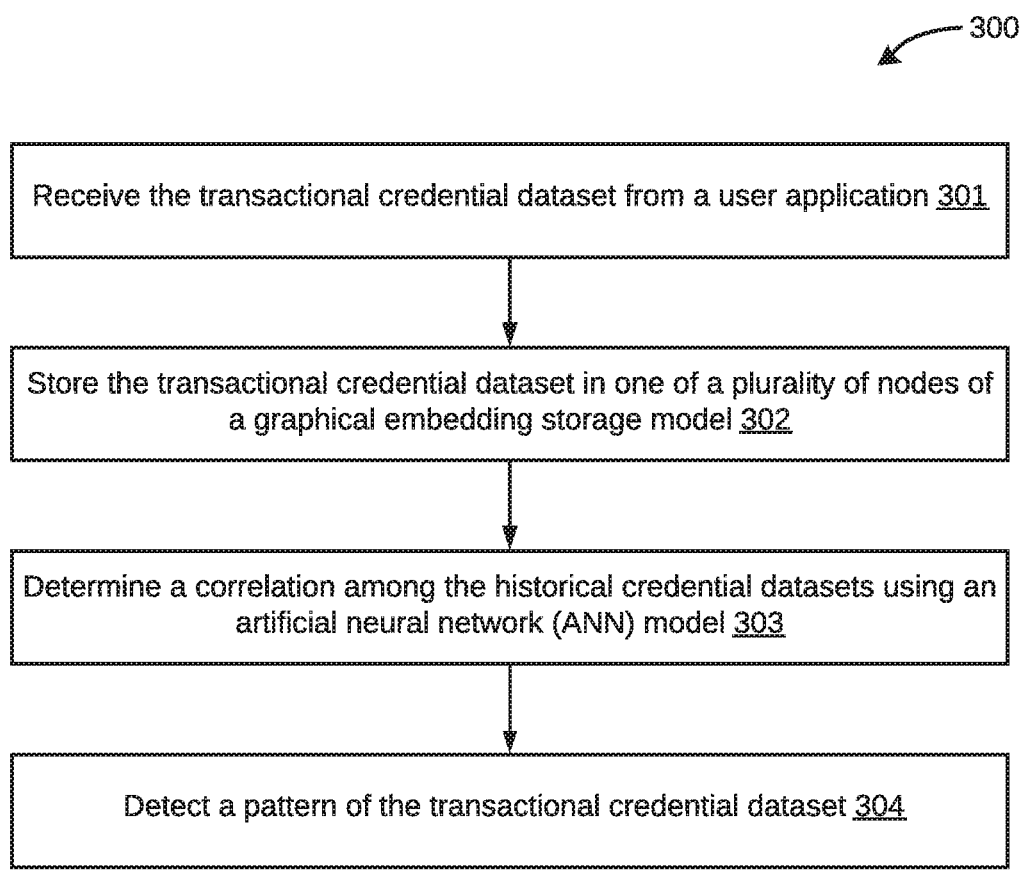
FIG. 3 is a flow diagram of an exemplary process for detecting a pattern in transactional credential dataset, in accordance with some embodiments of the present disclosure.

For example, referring now to FIG. 3, exemplary process for detecting a pattern in a transactional credential dataset is depicted via a flowchart, in accordance with some embodiments of the present disclosure. It should be noted that, the pattern in the transactional credential dataset is determined with the help of cryptographic device 101 of the system 100.

As illustrated in the flowchart, at step 301, the transactional credential dataset is received from the user application 103 (shown in FIG. 1). The received transactional credential dataset may be a prioritized transactional credential dataset, in particular the transactional credential dataset may be prioritized based on eligibility criteria of a credential policy for the user application 103.

At step 302, the transactional credential dataset is stored in one of a plurality of nodes of a GES model 203 of the cryptographic device 101. In some embodiment, historical credential datasets of the user may be stored in the one of the plurality of nodes. Herein, the one of the plurality of nodes may be in communication with a set of peer nodes. In some of the embodiment, any change in the credential datasets stored in the one of the plurality of nodes may be tracked by the peer nodes.

At step 303 a correlation among the historical credential datasets may be determined using an artificial neural network (ANN) model. Particularly, the ANN model may be trained based on credential datasets from a plurality of users stored in the plurality of nodes of the GES model 203 (shown in FIG. 2). Further, in some embodiment, a relativity between each of the two historical credential datasets is determined. It should be noted that each of the historical credential datasets may be assigned to one of a set of clusters based on the relativity with respect to each of the remaining historical credential datasets.

In some embodiment, the ANN model may be trained, wherein a cipher text corresponding to each of the credential datasets may be received initially. Then, a set of word vectors based on the cipher text may be determined. Thereafter, a plurality of combinations of word vectors with respect to the set of word vectors may be determined in order to train the ANN model. In some embodiment, the ANN model may be re-trained at a periodic interval to ingest learning from the transaction credential dataset.

At step 304, a pattern of the transactional credential dataset is detected based on the correlation. In some embodiment, a belongingness of the transactional credential dataset to one of the set of clusters may be determined. In some embodiment, the transactional credential dataset may be modified to mitigate or eliminate the pattern. It should be noted that a randomness of the transactional credential dataset may be increased iteratively using the ANN model till a modified transactional credential dataset has limited or no correspondence with the pattern. In some embodiment, a cipher text may be created based on the modified transactional credential dataset.

Figure 4:
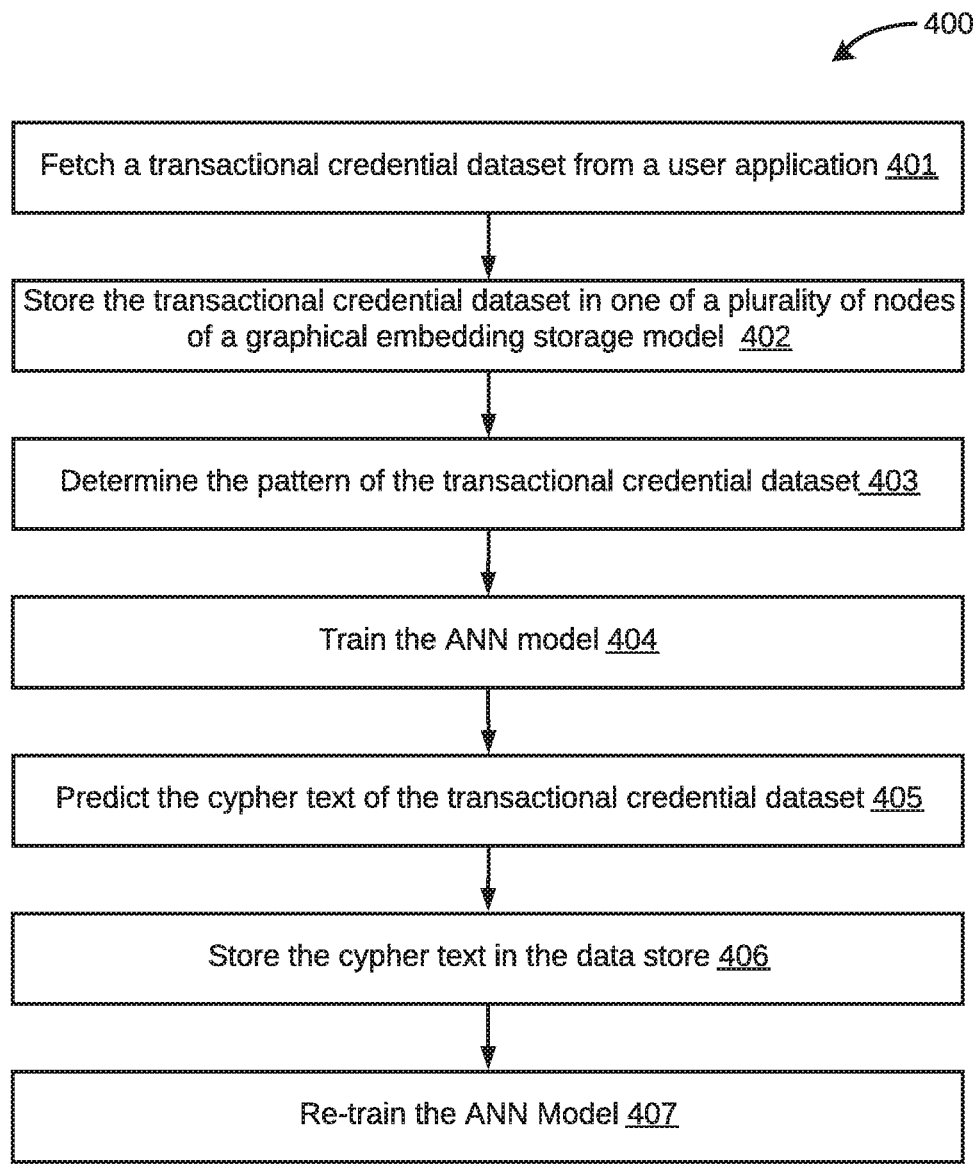
FIG. 4 is another flow diagram of a detailed exemplary process for detecting a pattern in transactional credential dataset, in accordance with some embodiments of the present disclosure.

Referring now to FIG. 4, another flow diagram 400 of a process for detecting a pattern in transactional credential dataset is depicted in greater detail via a flowchart, in accordance with some embodiments of the present disclosure. At step 401, a transactional credential dataset may be fetched from the user application 103 by the kernel 107 of the cryptographic device 101. The received dataset may be pre-prioritized based on an eligibility criterion of a credential policy. The credential policy may be provided and aligned to the user application 103. Now, the prioritized transactional credential dataset may be fetched by the cryptographic device 101 from the user application 103. It should be noted that the prioritized transactional credential dataset may be directly fetched from the user application 103 or communicated through the network layer 104 of the cryptographic device 101.

At step 402, the transactional credential dataset may be stored in a node of the GES model 203. The GES model 203 may include a plurality of nodes storing credential datasets corresponding to a plurality of users. It should be noted that each of the plurality of nodes may be assigned to a particular user and may be in communication with a set of peer nodes. The set of peer nodes for any given node may be used to track any change in the credential datasets of a user that is stored within the given node. Further, the nodes that are affected due to change in credential datasets may be tracked and isolated by the set of peer nodes. This help to eliminate any security breach as well as help the nodes to disconnect from affected node. Further, the pattern computation described in step 403 may be calculated based on the historic credential dataset stored within the node of any given end user. As will be described below, each of the nodes is labeled with a cluster group based on the relativity between their historic credential datasets.

At step 403, the pattern of the transactional credential dataset may be determined. When the pattern of the transactional credential dataset resembles to the historical patterns of the credential dataset, then it is easy for an unauthorized person to hack the transactional credential dataset. Therefore, in some embodiment, a correlation between the historical credential datasets may be determined. The correlation may be mapped with a threshold probabilistic score in order to determine whether the input is different or not. The determination of the correlation may be executed using an ANN model. It should be noted that the ANN model alone performs analysis, prediction and even error check operations. Further, an input provided to the ANN model is dynamic and may be subjected to a plurality of change in the hidden layer of the ANN model.

By the way of example, in case the threshold probabilistic score increases than the previous score, in such case the transactional credential dataset needs to be masked in the next layer. On the other hand, when the threshold probabilistic score does not exceed, then the transactional credential dataset may be adjoined with a cipher to measure a new probabilistic score. In particular, the probabilistic score is measured based on the difference in the patterns of the historical credential datasets. It should be noted that the score needs to be as low as possible, for enhanced data security. Further, the low score may indicate that datapoints are independent to each other.

Now, at step 404, the pattern of the credential dataset may be learnt in order to train the ANN model. The cipher text corresponding to each credential datasets may be fetched. Based on the fetched cipher text a set of word vectors may be determined. After determining the set of word vectors, all the possible combination of the set of word vectors may be determined. Now, using these combinations of the set of word vectors the ANN model may be trained. The ANN receives all the possible combination as its input to the neurons and trained by these combinations of word vectors. The ANN model may also learn all the patterns of the historical credential datasets. A plurality of iterations may be performed in order to the ANN model by providing all the combinations of word vectors. The ANN model may be trained to acknowledge end user not to provide same pattern of dataset, resulting in a robust data security system. The credential datasets & weights of the neurons are stored in unstructured format in the hidden layers of the ANN model that further generates checkpoints. Every checkpoint is identical and trained independently based on the credential dataset and other pre-defined factors.

At step 405, the cipher text for the transactional credential dataset may be predicted in order to provide the data security. A checkpoint may be created corresponding to a learned feature of a particular transactional dataset. Now, this checkpoint corresponding to a learned feature of a particular transactional dataset may be stored in the data store 102. The class of the credential dataset may be predicted by the prediction module 202 of the neural engine 106. Neuron activation for the checkpoints corresponding to the historical credential dataset and the transactional credential datapoints may be analyzed for the predicting a cipher text for the transactional credential dataset.

At step 406, the cipher text associated with the credential dataset may be stored in data store 102. Further, the cipher alphabets and the randomness of the cipher text may be generated and tuned based on the cluster. The relativity may help in understanding the difference between two different classes/clusters. Further, the complexity of randomness may increase based on the cluster relativity. The randomness is a parameter that helps to increase more amount of cipher text as well as complexity. It should be noted that the transactional credential dataset may be now converted into an encrypted credential dataset and then stored in the data store 102. Similarly, during transaction, the reverse decryption may be performed by the AES 105.

At step 407, the ANN model may be re-trained. Further, the error is measured based on the correlation determined in previous training of the ANN model. Whenever the ANN model is trained the correlation analysis may be the performed. Further, high error rate may be required, and every credential string may be exclusively differentiated. It should be noted that in each iteration of the prediction, the correlation analysis (CA) may be analyzed, whether its value is exceeding the threshold value or not. In case, the value of CA exceeds the threshold value then only it is acceptable. In other words, when the value of CA is lesser than that will not be considered. The ANN model may be retrained iteratively in a cyclic manner in order to improve efficiency and performance.

Consider an example, where the transactional credential dataset or the password inputted by the user is "dasr9Rishav@2019". After processing this transactional credential dataset through the cryptographic device 101, the obtained output will be given as below:

Output: #4SH386rA7634V2r83l28d728as6253r9201

The output shown above is a cipher text generated by the cryptographic device 101. Next time, for the same input, the output may not be the same. In other words, the output keeps varying even when the same input is fed to the user application 103. Hence, the robustness and the security of the system enhances with the ever-varying output.

The present invention may offer some advantages in order to get rid of the difficulties confronted in the conventional systems and methods. The present system detects a pattern in transactional credential dataset and randomizes the detected pattern, thereby enhancing the security of a user transaction. Additionally, the present system involves automated detection/randomization of the patterns using the neural networks, resulting in effortless detection and secured user transactions. The present system does not require network transmission network and can secure the pattern values within the checkpoint environment, thereby further enhancing the security of the transactional credential dataset.

Thus, the disclosed method and system tries to overcome the technical problem of not being able to detect and/or eliminate hidden patterns in the transactional credential datasets. Specifically, the method and system adapts/retrains the existing ANN model at a periodic interval to ingest learning from the transaction credential dataset to create a modified input credential dataset whose pattern does not correspond to the historical pattern. Thus, reverse engineering of the input credential dataset becomes much more difficult and in turn increases the security of the user transactions.

In light of the above mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

Figure 5:
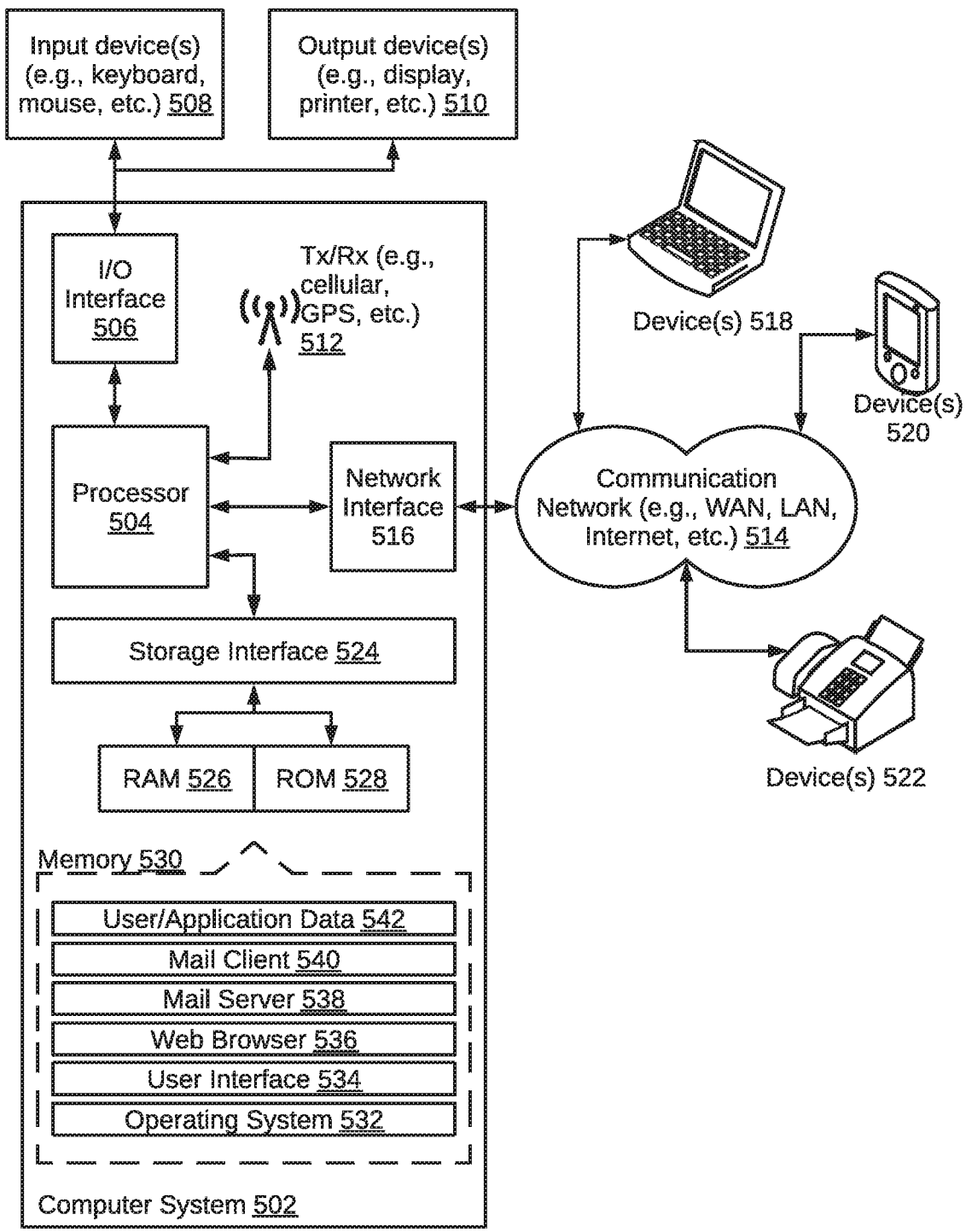
FIG. 5 illustrates a block diagram of an exemplary computer system for implementing embodiments consistent with the present disclosure.

The disclosed methods and systems may be implemented on a conventional or a general-purpose computer system, such as a personal computer (PC) or server computer. Referring now to FIG. 5, a block diagram of an exemplary computer system 502 for implementing various embodiments is illustrated. Computer system 502 may include a central processing unit ("CPU" or "processor") 504. Processor 504 may include at least one data processor for executing program components for executing user or system-generated requests. A user may include a person, a person using a device such as such as those included in this disclosure, or such a device itself. Processor 504 may include specialized processing units such as integrated system (bus) controllers, memory management control units, floating point units, graphics processing units, digital signal processing units, etc. Processor 504 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 504 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 504 may be disposed in communication with one or more input/output (I/O) devices via an I/O interface 507. I/O interface 507 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 506, computer system 502 may communicate with one or more I/O devices. For example, an input device 508 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 510 may be a printer, fax machine, video display (for example, cathode ray tube (CRT), liquid crystal display (LCD), light-emitting diode (LED), plasma, or the like), audio speaker, etc. In some embodiments, a transceiver 512 may be disposed in connection with processor 504. Transceiver 512 may facilitate various types of wireless transmission or reception. For example, transceiver 512 may include an antenna operatively connected to a transceiver chip (for example, TEXAS® INSTRUMENTS WILINK WL1286® transceiver, BROADCOM® BCM4550IUB8® transceiver, INFINEON TECHNOLOGIES® X-GOLD 518-PMB9800® transceiver, or the like), providing IEEE 802.6a/b/g/n, Bluetooth, FM, global positioning system (GPS), 2G/3G HSDPA/HSUPA communications, etc.

In some embodiments, processor 504 may be disposed in communication with a communication network 514 via a network interface 516. Network interface 516 may communicate with communication network 514. Network interface 516 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 514 may include, without limitation, a direct interconnection, local area network (LAN), wide area network (WAN), wireless network (for example, using Wireless Application Protocol), the Internet, etc. Using network interface 516 and communication network 514, computer system 502 may communicate with devices 518, 520, and 522. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® e-reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 502 may itself embody one or more of these devices.

In some embodiments, processor 504 may be disposed in communication with one or more memory devices (for example, RAM 526, ROM 528, etc.) via a storage interface 524. Storage interface 524 may connect to memory 530 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 530 may store a collection of program or database components, including, without limitation, an operating system 532, user interface application 534, web browser 536, mail server 538, mail client 540, user/application data 542 (for example, any data variables or data records discussed in this disclosure), etc. Operating system 532 may facilitate resource management and operation of computer system 502. Examples of operating systems 532 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 534 may facilitate display, execution, interaction, manipulation, or operation of program components through textual or graphical facilities. For example, user interfaces may provide computer interaction interface elements on a display system operatively connected to computer system 502, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 502 may implement a web browser 536 stored program component. Web browser 536 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 502 may implement a mail server 538 stored program component. Mail server 538 may be an Internet mail server such as MICROSOFT® EXCHANGE® mail server, or the like. Mail server 538 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 538 may utilize communication protocols such as internet message access protocol (IMAP), messaging application programming interface (MAPI), Microsoft Exchange, post office protocol (POP), simple mail transfer protocol (SMTP), or the like. In some embodiments, computer system 502 may implement a mail client 540 stored program component. Mail client 540 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 502 may store user/application data 542, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

The specification has described an enhanced data security system and method thereof. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of detecting a pattern in transactional credential dataset provided by a user, the method comprising:
   receiving, by a cryptographic device, the transactional credential dataset from a user application, wherein the transactional credential dataset is provided by a user to the user application;
   storing, by the cryptographic device, the transactional credential dataset in one of a plurality of nodes of a graphical embedding storage model, wherein the one of the plurality of nodes further stores historical credential datasets of the user;
   determining, by the cryptographic device, a correlation among the historical credential datasets using an artificial neural network (ANN) model, wherein the ANN model is trained based on credential datasets from a plurality of users stored in the plurality of nodes of the graphical embedding storage model, wherein ANN model is further trained by:
      receiving a cipher text corresponding to each of the credential datasets;
      determining a set of word vectors based on the cipher text;
      determining a plurality of combinations of word vectors based on the set of word vectors; and
      training the ANN model, using the plurality of combinations of word vectors, to determine a correlation among the credential datasets; and
   detecting, by the cryptographic device, a pattern of the transactional credential dataset based on the correlation.

2. The method of claim 1, wherein the transactional credential dataset is prioritized based on eligibility criteria of a credential policy for the user application.

3. The method of claim 1, wherein the one of the plurality of nodes is in communication with a set of peer nodes, and wherein the set of peer nodes is used to track any change in the credential datasets stored in the one of the plurality of nodes.

4. The method of claim 1, wherein determining the correlation comprises:
   determining a relativity between each of the two historical credential datasets; and
   assigning each of the historical credential datasets into one of a set of clusters based on the relativity with respect to each of the remaining historical credential datasets.

5. The method of claim 4, wherein detecting the pattern comprises determining a belongingness of the transactional credential dataset to one of the set of clusters.

6. The method of claim 1, further comprising re-training the ANN model at a periodic interval to ingest learning from the transaction credential dataset.

7. The method of claim 1, further comprising modifying the transactional credential dataset to mitigate or eliminate the pattern.

8. The method of claim 7, wherein modifying the transactional credential dataset comprises iteratively increasing a randomness of the transactional credential dataset using the ANN model till a modified transactional credential dataset has limited or no correspondence with the pattern.

9. The method of claim 8, further comprising creating the cipher text based on the modified transactional credential dataset.

10. A system for detecting a pattern in transactional credential dataset provided by a user, the system comprising:
    a processor; and
    a memory communicatively coupled to the processor, wherein the memory stores processor-executable instructions, which, on execution, causes the processor to:
    receive the transactional credential dataset from a user application, wherein the transactional credential dataset is provided by a user to the user application;
    store the transactional credential dataset in one of a plurality of nodes of a graphical embedding storage model, wherein the one of the plurality of nodes further stores historical credential datasets of the user;
    determine a correlation among the historical credential datasets using an artificial neural network (ANN) model, wherein the ANN model is trained based on credential datasets from a plurality of users stored in the plurality of nodes of the graphical embedding storage model, wherein processor-executable instructions further cause the processor to:
       receive cipher text corresponding to each of the credential datasets;
       determine a set of word vectors based on the cipher text;
       determine plurality of combinations of word vectors based on the set of word vectors; and
       train the ANN model, using the plurality of combinations of word vectors, to determine a correlation among the credential datasets; and
    detect a pattern of the transactional credential dataset based on the correlation.

11. The system of claim 10, wherein the transactional credential dataset is prioritized based on eligibility criteria of a credential policy for the user application, wherein the one of the plurality of nodes is in communication with a set of peer nodes, and wherein the set of peer nodes is used to track any change in the credential datasets stored in the one of the plurality of nodes.

12. The system of claim 10, wherein determining the correlation comprises:

determining a relativity between each of the two historical credential datasets; and assigning each of the historical credential datasets into one of a set of clusters based on the relativity with respect to each of the remaining historical credential datasets.

13. The system of claim 12, wherein detecting the pattern comprises determining a belongingness of the transactional credential dataset to one of the set of clusters.

14. The system of claim 10, wherein the processor-executable instructions further cause the processor to re-train the ANN model at a periodic interval to ingest learning from the transaction credential dataset.

15. The system of claim 10, wherein the processor-executable instructions further cause the processor to modify the transactional credential dataset to mitigate or eliminate the pattern.

16. The system of claim 15, wherein modifying the transactional credential dataset comprises iteratively increasing a randomness of the transactional credential dataset using the ANN model till a modified transactional credential dataset has limited or no correspondence with the pattern.

17. The system of claim 16, wherein the processor-executable instructions further cause the processor to create the cipher text based on the modified transactional credential dataset.

18. A non-transitory computer-readable medium storing computer-executable instructions for:

receiving the transactional credential dataset from a user application, wherein the transactional credential dataset is provided by the user to the user application;

storing the transactional credential dataset in one of a plurality of nodes of a graphical embedding storage model, wherein the one of the plurality of nodes further stores historical credential datasets of the user;

determining a correlation among the historical credential datasets using an artificial neural network (ANN) model, wherein the ANN model is trained based on credential datasets from a plurality of users stored in the plurality of nodes of the graphical embedding storage model, wherein ANN model is further trained by:

receiving a cipher text corresponding to each of the credential datasets:

determining a set of word vectors based on the cipher text;

determining a plurality of combinations of word vectors based on the set of word vectors; and training the ANN model, using the plurality of combinations of word vectors, to determine a correlation among the credential datasets; and detecting a pattern of the transactional credential dataset based on the correlation.

\* \* \* \* \*